United States Patent
Schneider et al.

(10) Patent No.: US 7,631,019 B2
(45) Date of Patent: Dec. 8, 2009

(54) DISTRIBUTING DATA ACROSS DIFFERENT BACKING DATA STORES

(75) Inventors: James P. Schneider, Raleigh, NC (US); Luke Meyer, Cary, NC (US); David Parker, Redwood City, CA (US)

(73) Assignee: Red Hat, Inc., Raleigh, NC (US)

( * ) Notice: Subject to any disclaimer, the term of this patent is extended or adjusted under 35 U.S.C. 154(b) by 433 days.

(21) Appl. No.: 11/809,635

(22) Filed: May 31, 2007

(65) Prior Publication Data

US 2008/0301123 A1      Dec. 4, 2008

(51) Int. Cl.
*G06F 17/30* (2006.01)
(52) U.S. Cl. .................... 707/203; 707/2; 707/3; 707/1; 707/200
(58) Field of Classification Search ........... 707/1, 707/2, 3, 104.1, 203
See application file for complete search history.

(56) References Cited

U.S. PATENT DOCUMENTS 6,581,075 B1 *   6/2003   Guturu et al. ............. 707/201
2005/0039036 A1 *   2/2005   Eisen ...................... 713/193
2007/0050429 A1 *   3/2007   Goldring et al. ........... 707/203
2007/0260575 A1 *   11/2007  Robinson et al. ............ 707/1
2009/0177610 A1 *   7/2009   Kawamura et al. ........... 706/47

* cited by examiner

*Primary Examiner*—Don Wong
*Assistant Examiner*—Angela M Lie
(74) *Attorney, Agent, or Firm*—Blakely, Sokoloff, Taylor & Zafman LLP

(57) ABSTRACT

A method and apparatus for distributing data across multiple data stores are provided. In one embodiment, records are maintained for multiple data stores that associate primary key indicators and time intervals pertaining to data items with distinct data stores. When a request pertaining to at least one data item is received, a primary key indicator and the time of this data item are determined. Further, the records maintained for the multiple data stores are searched using the primary key indicator and the time of the data item to find one or more data stores for the data item.

18 Claims, 6 Drawing Sheets

| stream IDs 302 | timestamps 304 | credentials 306 |
|---|---|---|
| 0-3333 | -2147483648 to 117709000 | http://testtsdb1/db |
| 3334-6666 | -2147483648 to 117709000 | http://testtsdb2/db |
| 6667-9999 | -2147483648 to 117709000 | http://testtsdb3/db |
| 0-4999 | 117709001 to 2147483647 | http://testtsdb4/db |
| 5000-9999 | 117709001 to 2147483647 | http://testtsdb5/db |

DISTRIBUTING DATA ACROSS DIFFERENT BACKING DATA STORES

TECHNICAL FIELD

Embodiments of the present invention relate to data management, and more specifically to distributing data across different backing data stores.

BACKGROUND

A typical enterprise management system includes a front end component and a back end component. The front end component includes one or more client applications (e.g., web browsers and/or special purpose client applications) that generate data requests and transfer these data requests to the back end component. The data requests may provide data items to be stored or ask for data items to be returned. The back end component may include a server and a database. The server processes the data requests and accesses the database to store or retrieve the requested data.

In some enterprise management systems, a single backing data store may not be able to handle all the data generated by the front end component. For example, an enterprise management system responsible for monitoring a company's network and computers on the company's network may be constantly measuring parameters of various information technology (IT) assets (e.g., network devices, host computers, servers, etc.) and sending these measurements to the back end component for storage. With such a large amount of incoming data, it becomes crucial to be able to distribute this data across multiple data stores in an efficient manner.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
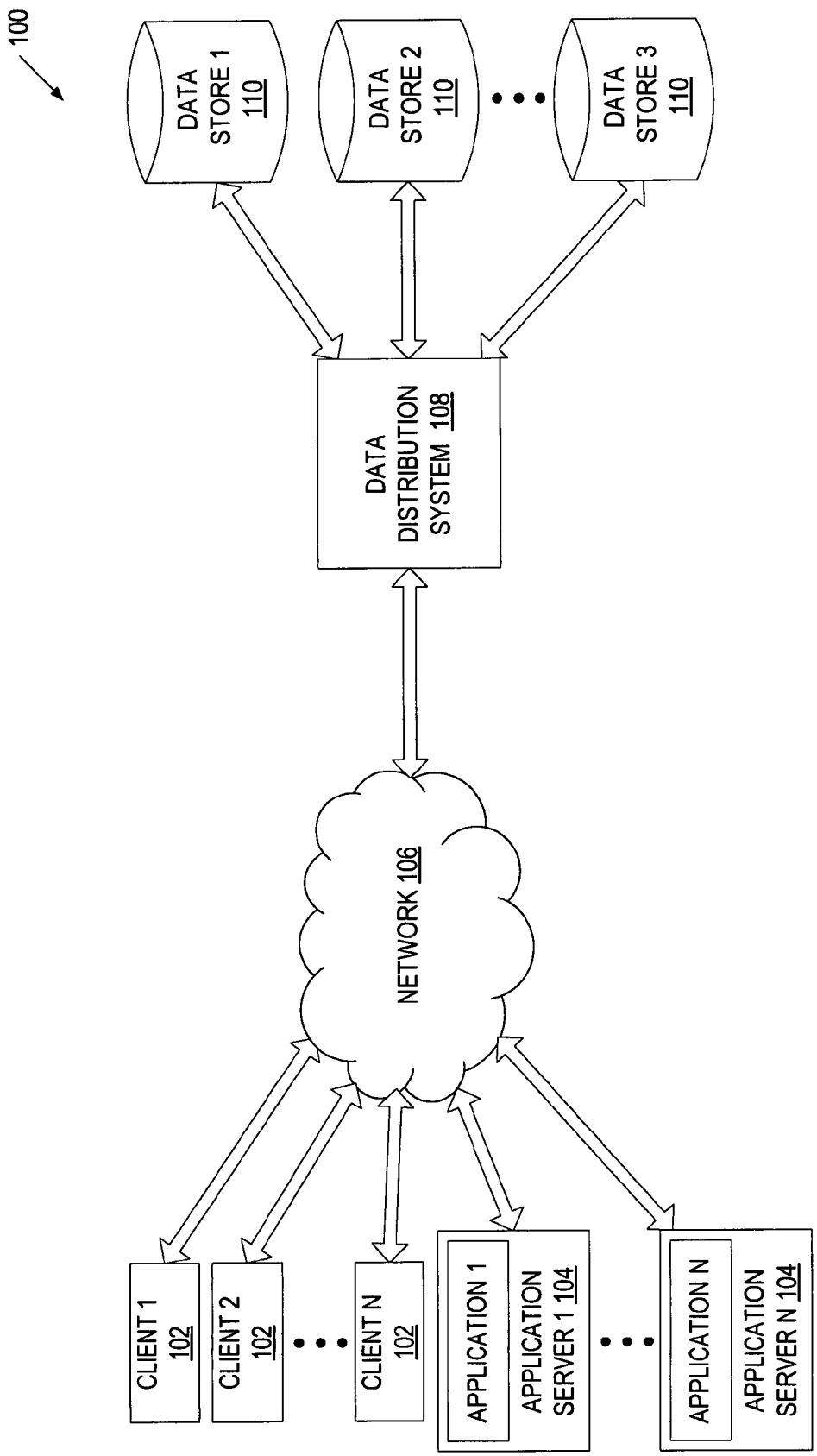
FIG. 1 is a block diagram of an exemplary architecture in which embodiments of the invention may be implemented.

Described herein is a method and apparatus for distributing data across multiple data stores. In one embodiment, records are maintained for multiple data stores that associate primary key indicators and time intervals pertaining to data items with distinct data stores. A primary key indicator may be represented as the primary key of a data item or a stream derived from the primary key of the data item (a stream ID). For example, the records may be stored in a table that includes a stream ID range column, a time interval column and a data store credentials column. Each record associates a unique combination of a stream ID range and a time interval with distinct data store credentials. The data store credentials may include information for accessing a specific data store and may be in the form of, for example, a URL (e.g., for a web interface to a database), a database session identifier (e.g., for an Oracle® database), or a set of a user name, password and hostname (e.g., for a MySQL® database).

When a request pertaining to at least one data item is received from a client, the request is analyzed to determine a primary key indicator (e.g., stream ID) and the time of the data item. The request pertaining to the data item may be a request to store the data item or a request to retrieve the data item. The records maintained for the multiple data stores are then searched using the primary key indicator (e.g., stream ID) and the time of the data item to find one or more data stores for the data item. Further, the found data store(s) is (are) accessed to perform the request pertaining to the data item (e.g., to store the data item in this data store, or retrieve or delete the data item(s) from the data store(s)).

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include client devices (clients) 102, a data distribution system 108 and a network 106. The clients 102 may be, for example, personal computers (PCs), mobile phones, palm-sized computing devices, personal digital assistants (PDAs), etc.

The clients 102 are coupled to the data distribution system 108 via the network 106, which may be a public network (e.g., Internet) or a private network (e.g., Ethernet or a local area Network (LAN)). The data distribution system 108 may reside on one or more server machines and may be responsible for distributing data across data stores 110. The data distribution system 108 can be implemented as software, hardware or a combination of both.

The network architecture 100 may also include one or more application servers 104 that host various applications issuing data requests such as requests to store data, retrieve data or delete data. The application servers 104 operate as clients in communications with the data distribution system 108.

The data stores 110 may reside on database servers and may represent databases of different types such as a repository hosted by a web server, an Oracle database, a MySQL database, etc. Alternatively, the data stores 110 may represent multiple instances of the same database type, or a combination of the above. In one embodiment, the existence of multiple data stores 110 is invisible to the clients 102 and the application servers 104. That is, the clients 102 and the application servers 104 do not have to be aware of the number, type and characteristics of the data stores 110. Instead, the data stores 110 are managed by the data distribution system 108 that provides a unified interface to the clients 102 and/or application servers 104.

The data distribution system 108 manages the distribution of incoming data items across the data stores 110. The incoming data items have corresponding primary keys and time parameters. Primary key may include one or more attributes of the data item or any other information characterizing the data item. For example, the primary key may be an account ID, a measurement record ID, a specific measurement, the source of the data item, a specific class of a data item or some other distinguishing characteristics. A time parameter may be in the form of a timestamp or some other time-related indicator. The data distribution system 108 maintains records for the data stores 110 that specify which data stores 110 are responsible for data items within particular primary key indicator ranges and particular time intervals. A primary key indicator range may be, for example, a range of primary keys, a range of streams derived from the primary keys (referred to herein as stream IDs), etc. If a new data store is added, the data distribution system 108 associates the new data store with a combination of a primary key indicator range and a time interval, and routes relevant data items to the new data store.

By way of example, the architecture 100 may be used by a network management system, in which client 102 is part of an enterprise network comprising of various IT assets such as desktop computers, laptop computers, network printers, switches, routers, gateways, firewalls, etc. The IT assets may also include operating systems and applications hosted by the above devices, network services or websites provided by the above devices, etc. An application running on the client 102 repetitively measures parameters of the IT assets and sends those measurements to the data distribution system 108. Each measurement is sent with its measurement record ID (primary key) and timestamp. The data distribution system 108 uses primary key and timestamp information of the measurements to decide which data stores 110 are responsible for individual measurements.

Figure 2:
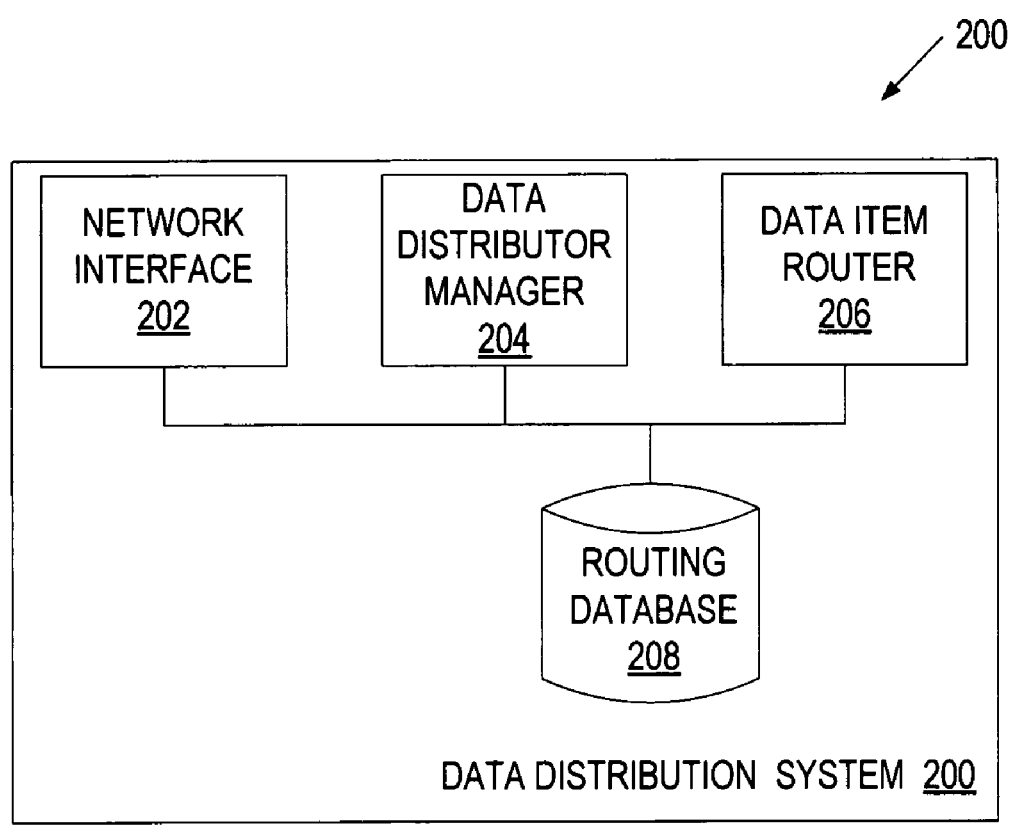
FIG. 2 is a block diagram of one embodiment of a data distribution system.

FIG. 2 is a block diagram of one embodiment of a data distribution system 200. The data distribution system 200 includes a network interface 202, a data distribution manager 204, a data item router 206 and a routing database 208. The network interface 202 is responsible for receiving requests from clients and sending responses to clients.

The data distribution manager 204 is responsible for maintaining records in the routing database 208 that associate different backing data stores with distinct combinations of primary key indicator ranges and time intervals. In one embodiment, the data distribution manager 204 is also responsible for dynamically adding records to the routing database 208 for new backing data stores as will be discussed in more detail below.

When the network interface 202 receives a request pertaining to a data item, the data distribution manager 204 analyzes the request and determines which backing data store is responsible for the requested data item. In particular, the data distribution manager 204 determines a primary key indicator (e.g., primary key or a stream derived from the primary key) and a time parameter of the data item, and searches the database 208 for a record having a primary key indicator range covering the primary key indicator of the requested data item and a time interval covering the time parameter of the requested data item. The requested data item may be a data item to be stored, a data item to be retrieved, or a data item to be deleted. Alternatively, the request received by the network interface 202 may pertain to more than one data item (e.g., to retrieve or delete multiple data items), and may indicate a range of primary keys and/or a range of time parameters (e.g., a range of timestamps). Then, the data distribution manager 204 would search the database 208 for one or more records matching the primary key indicator(s) (e.g., stream IDs) and the time parameter(s) of the requested data item(s).

Upon finding a matching record, the data distribution manager 204 retrieves database information from the matching record. The database information may include database credentials for accessing a particular backing data store. The data item router 206 uses the database credentials to access the corresponding data store and perform the request pertaining to the data item. In one embodiment, the data item router 206 first creates a database query for performing the request (e.g., retrieving the requested data item or inserting the requested data item), and then sends the query to the relevant data store. The data item router 206 may include various plugins, each being responsible for providing queries for a specific data type. In another embodiment, the data item router 206 does not provide queries but merely sends the requests to a corresponding data store, which may have an interface that converts requests into database queries.

In an alternative embodiment, the data distribution manager 204 finds multiple matching records in the database 208 (e.g., if the request pertains to multiple data items) and retrieves database access credentials from each matching record. The data item router 206 then uses the database credentials to access each data store individually in a manner discussed above.

Figure 3A:
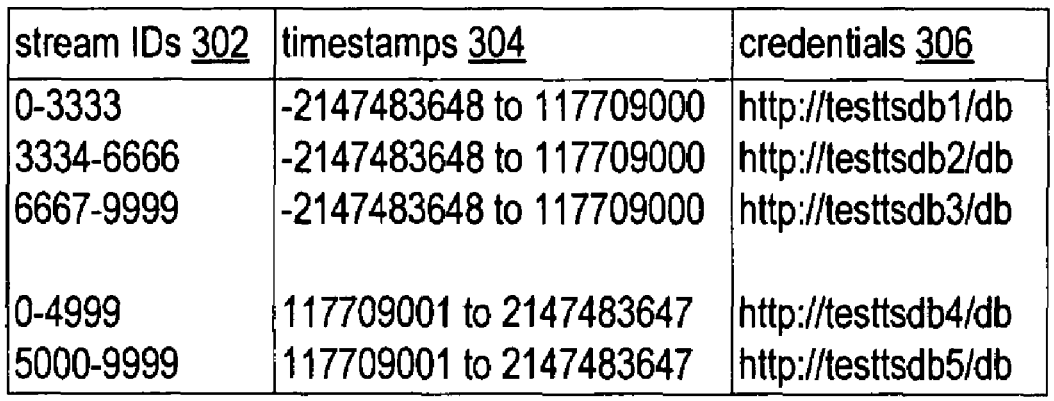
FIG. 3 illustrates an exemplary data routing table, in accordance with one embodiment of the invention.
Figure 3B:
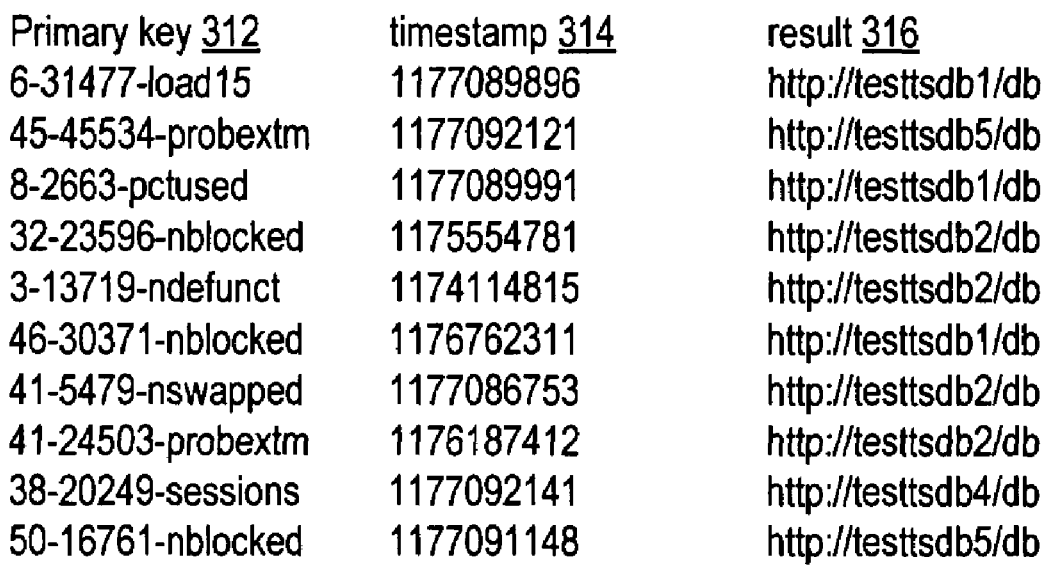

FIG. 3 illustrates an exemplary format of a routing database and exemplary records stored in the routing database, according to one embodiment of the present invention. As shown, table 300 may include columns 302, 304 and 306. Column 302 stores primary key indicator ranges in the form of stream ID ranges. A stream ID may be an integer portion of the primary key, a substring of the primary key, a hash of the primary key, etc. In the illustrated example, primary keys can take one of two forms: (a) two strings of digits and a string of letters, digits, and underscores, separated by a dash ('-') character (e.g., 4-3349-nblocked), or (b) a string of letters and two digit strings, separated by a dash ('-') character (e.g., Long-Legs-87-65311). In both cases, the stream ID is defined using the second digit string as a number and taking its remainder modulo 10,000 (e.g., 3349 for the first example, and 5311 for the second example).

The column 304 stores timestamp intervals. In the illustrated example, the timestamps are measured as seconds since midnight, Jan. 1, 1970.

The credentials column 306 stores information for accessing backing data stores. In the illustrated example, the credentials are used as the URL for a web interface to the database. For simplicity, the table 300 does not include records with multiple URLs, although such instances may be possible. For example, a single record can include two URLs. In one embodiment, these URLs may be used sequentially (e.g., if the database access via the first URL fails, the second URL is used, and so on). In another embodiment, a data request is passed to all URLs specified in the record, making a distribution interface responsible for collating the responses and removing duplicates.

Also for simplicity, the table 300 does not include records with overlapping timestamps or stream IDs (e.g., there may be a record for stream IDs 2500-4999 with timestamps of 110000000 to 117710000, in addition to the records shown in the table 300). If such an occurrence takes place, any one of the multiple records with overlapping data can be first used to retrieve the database credentials. If the database access via the first URL fails, the URL from the next record may be used to store or retrieve the requested data item, and so on. Alternatively, all of the URLs may be used, with the distribution interface being responsible for collating the responses and removing duplicates.

List 310 includes results 316 determined for an exemplary group of data items according to one embodiment of the invention. Each data item has a primary key listed under the heading 312 and a timestamp listed under the heading 314. The result 316 for each data item was determined using the table 300. In one embodiment, the result is determined by performing a test for inclusion. Alternatively, if warranted, more complex tests may be used. For example, the result may be determined using a technique known as a binary search of an ordered list. The search finds two adjacent timestamps that bracket the timestamp of the requested data item in question. In particular, the search starts at the end time points of the array (which correspond to the infinite past and the infinite future), and moves inwards in steps that reduce the number of entries to be considered by about one half each time. When the matching timestamp interval is found, a corresponding stream ID range is checked to see if it covers the string ID of the requested data item. If so, the search stops. If not, the search continues as discussed above.

Figure 4:
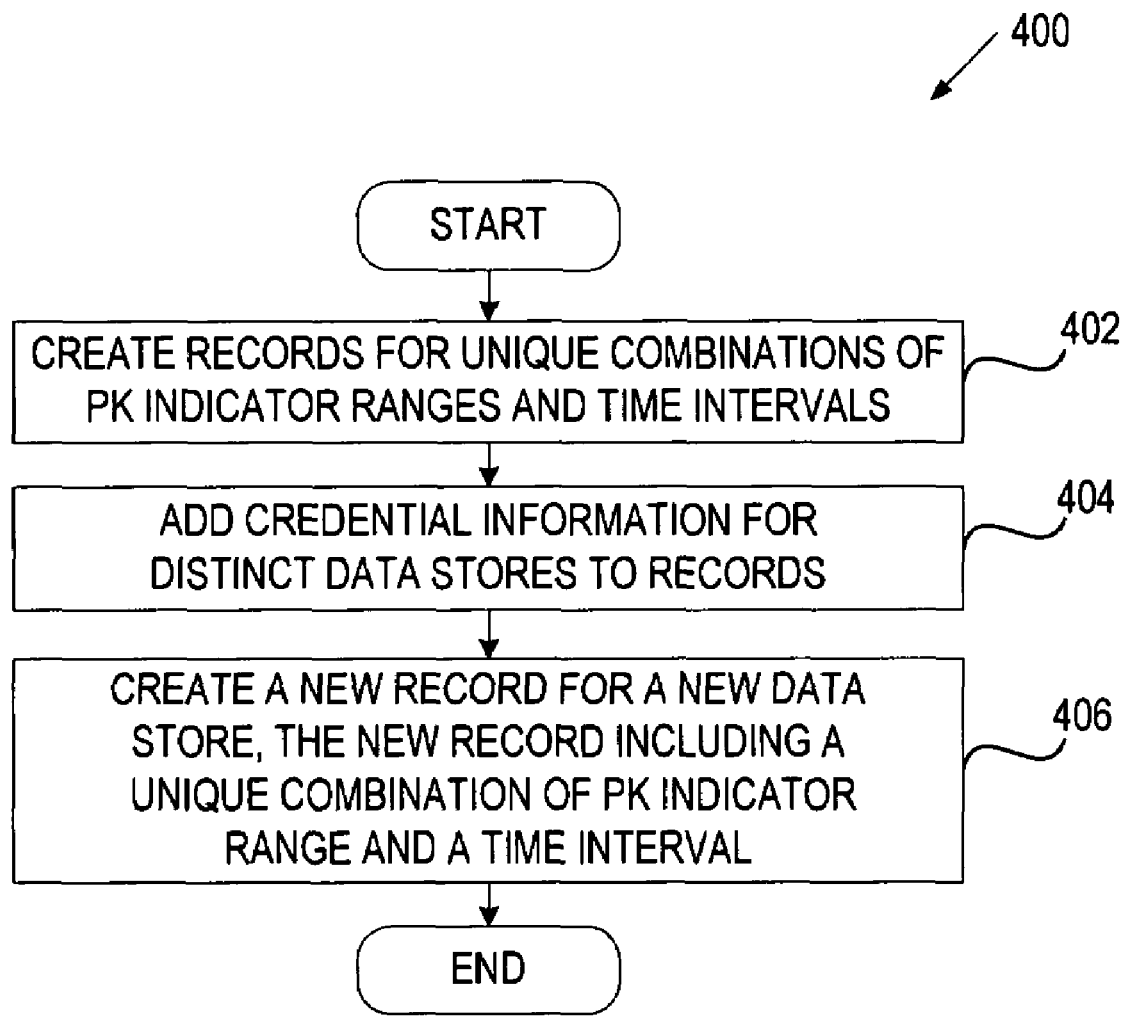
FIG. 4 is a flow diagram of one embodiment of a method for maintaining records facilitating distribution of data across multiple backing data stores.

FIG. 4 is a flow diagram of one embodiment of a method 400 for maintaining records facilitating distribution of data across multiple backing data stores. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a data distribution system 108 of FIG. 1.

Referring to FIG. 4, method 400 begins with processing logic creating records for distinct combinations of primary key indicator ranges and time intervals (block 402). In one embodiment, the records are created based on user input of primary key indicator ranges (e.g., stream ID ranges) and time intervals. Alternatively, the records are created based on user input of the starting and ending values of the entire primary key indicator array and the number of desired records. Processing logic then automatically divides the primary key indicator array into several primary key indicator ranges, creates timestamps intervals, and records distinct combinations of primary key indicator ranges and timestamps intervals.

At block 404, processing logic adds credentials information to the records created at block 402. The credentials information specifies a path for accessing a specific backing data store (e.g., URL, database session, username/password/hostname, etc.). Each record may have credentials for a single data store or multiple data stores.

At block 406, processing logic receives an indication that a new data store is being added to the existing data stores, and creates a new record for this data store. The indication may be provided by a user (e.g., a system administrator) via a request identifying a new data store. The user may also provide a desired primary key indicator range and/or time interval that should be covered by the new data store. Alternatively, processing logic automatically determines an unused combination of a primary key indicator range and a time interval and assigns it to the new data store.

In another embodiment, when a new data store is added, processing logic dynamically adjusts the primary key indicator ranges, and sets the time interval for the new data store to be from the moment the new data store is activated till the end of time. For example, if there are three primary key indicator ranges of 0000-3333, 3334-6666, and 6667-9999, with a time interval extending to the "end of time", and a new data store becomes available at timestamp 1180479600, processing logic would update the existing records to have an end time of 1180479599, and create new records beginning at 1180479600, extending to the end of time, covering primary key indicator ranges 0000-2499, 2500-4999, 5000-7499, and 7500-9999.

Figure 5:
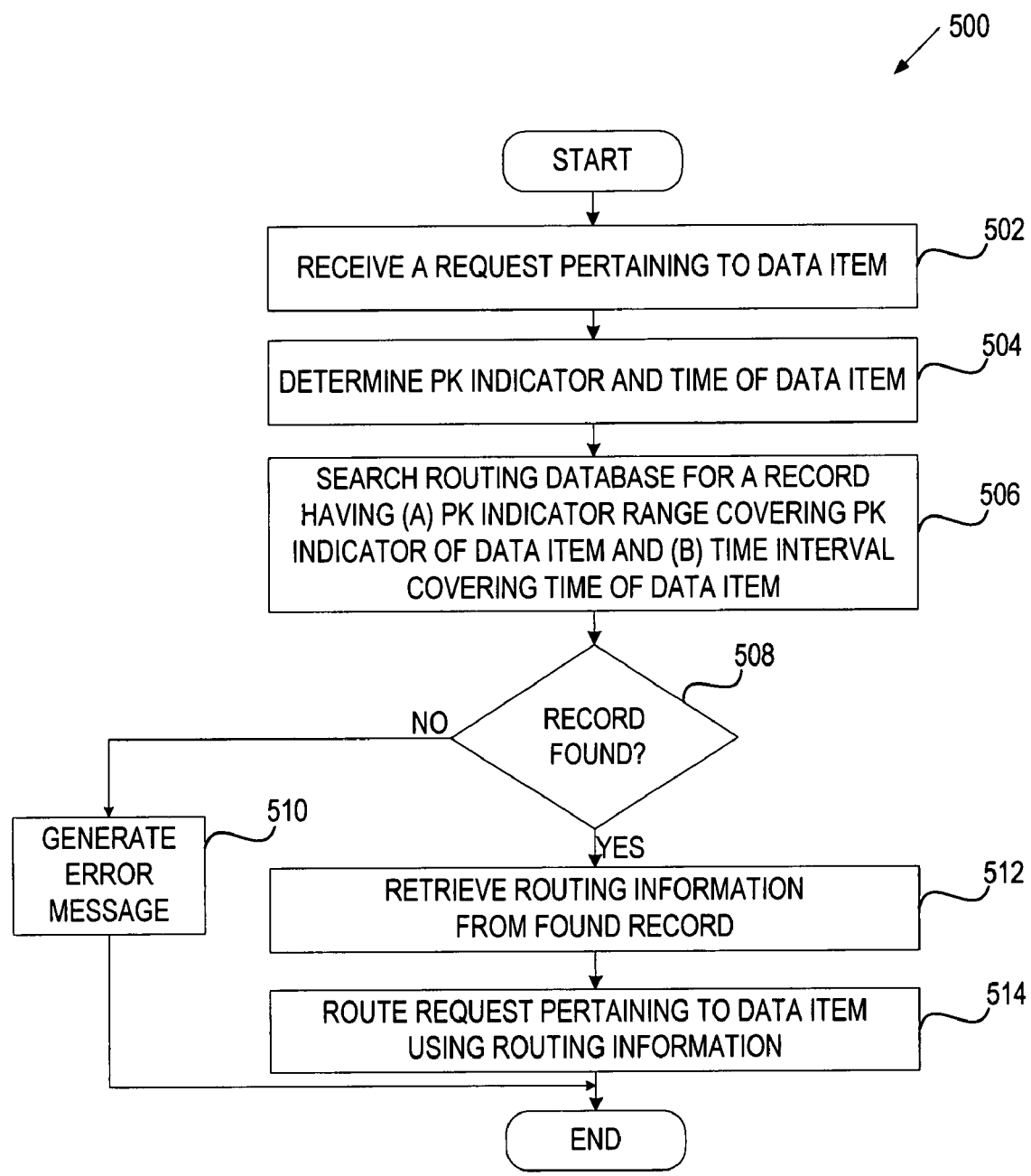
FIG. 5 is a flow diagram of one embodiment of a method for distributing incoming data across multiple backing data stores.

FIG. 5 is a flow diagram of one embodiment of a method 500 for distributing incoming data across multiple backing data stores. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a data distribution system 108 of FIG. 1.

Referring to FIG. 5, method 500 begins with processing logic receiving a request pertaining to one or more data items (block 502). The request may ask to store the data item(s), retrieve the data item(s) or delete the data item(s) from a database.

At block 504, processing logic determines a primary key indicator and a time parameter of the requested data item. The primary key indicator may be, for example, the primary key (e.g., an account ID, a measurement record ID, etc.), or a stream derived from the primary key (e.g., an integer portion of the primary key, a hash of the primary key, etc.). The time parameter may be, for example, a timestamp or some other time-related indicator. Alternatively, if the request pertains to multiple data items, processing logic may determine a range of primary key indicators and/or a range of time parameters.

At block 506, processing logic searches a routing database for a record having a primary key indicator range covering the primary key indicator of the data item, and a time interval covering the time parameter of the requested data item. If the matching record is not found (block 508), processing logic generates an error message. Otherwise, if the matching record is found, processing logic retrieves routing information for accessing a specific backing data store from the found record (block 512), and routes the request pertaining to the data item to the specific data store using the routing information (block 514).

In another embodiment, in which the request pertains to multiple data items, processing logic may find multiple matching records in the routing database, retrieve routing information for an individual backing data store from each matching record, and route the request to each individual backing data store using corresponding routing information.

Figure 6:
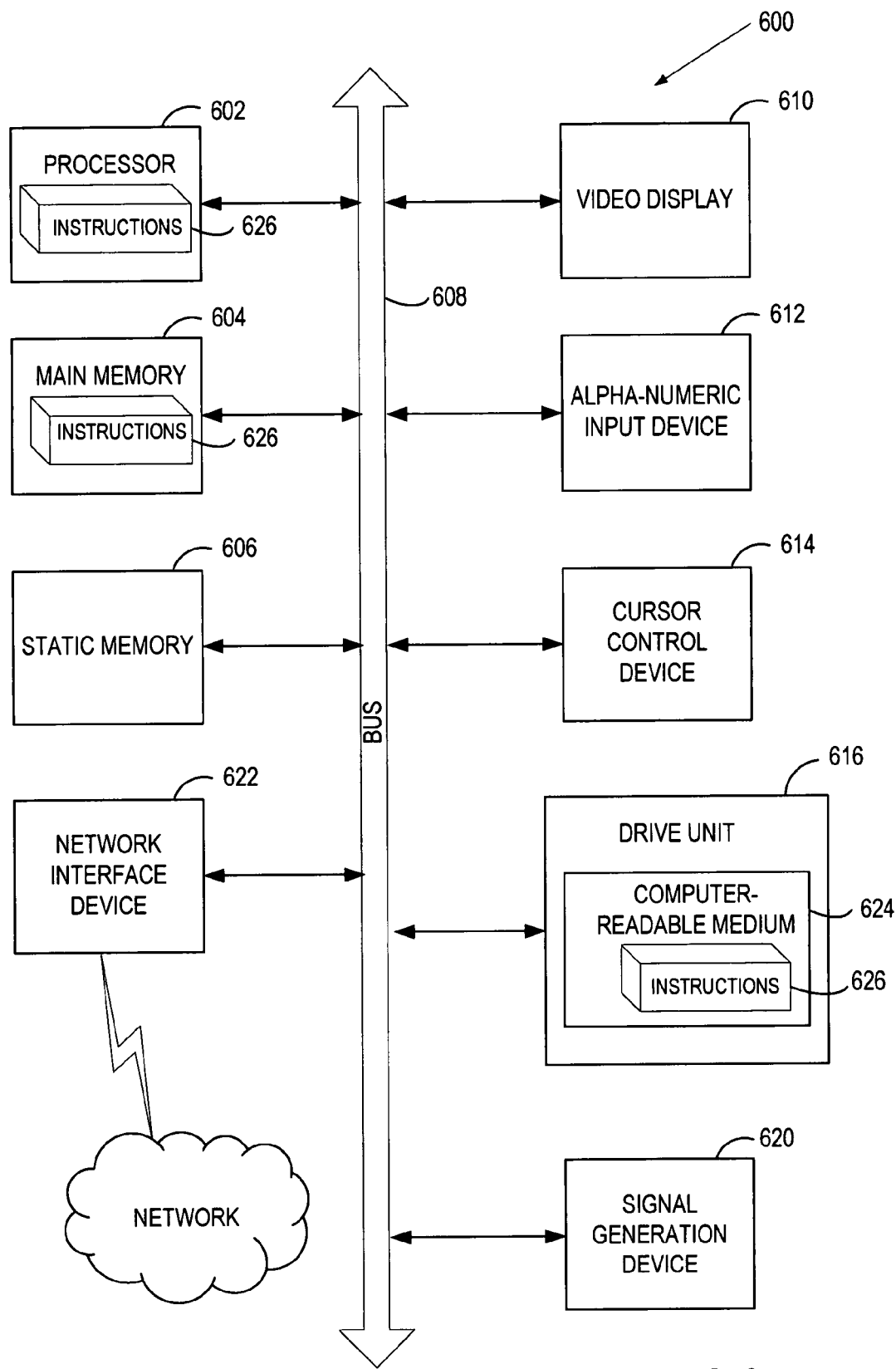
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device.

The exemplary computer system 600 includes a processing device 602, a main memory 604 (e.g., read-only memory (ROM), flash memory, dynamic random access memory (DRAM) such as synchronous DRAM (SDRAM) or RDRAM, etc.), and a static memory 606 (e.g., flash memory, static random access memory (SRAM), etc.), which may communicate with each other via a bus 630. Alternatively, the processing device 602 may be connected to memory 604 and/or 606 directly or via some other connectivity means.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 602 is configured to execute processing logic 626 for performing the operations and steps discussed herein.

The computer system 600 may further include a network interface device 622. It also may include a video display unit 610 (e.g., a liquid crystal display (LCD) or a cathode ray tube (CRT)), an alphanumeric input device 612 (e.g., a keyboard), a cursor control device 614 (e.g., a mouse), and/or a signal generation device 620 (e.g., a speaker).

The computer system 600 may also include a data storage device 616 having a machine-accessible storage medium 624 on which is stored one or more sets of instructions (e.g., software 626) embodying any one or more of the methodologies or functions described herein. The software 626 may also reside, completely or at least partially, within the main memory 604 and/or within the processing device 602 during execution thereof by the computer system 600, the main memory 604 and the processing device 602 also constituting machine-accessible storage media. The software 626 may further be transmitted or received over a network 620 via the network interface device 622.

While the machine-accessible storage medium 624 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   maintaining a plurality of records corresponding to a plurality of data stores, each of the plurality of records associating primary key indicators and time intervals pertaining to data items with distinct one or more of the plurality of data stores, wherein maintaining the plurality of records corresponding to the plurality of data stores comprises:
      creating the plurality of records, each of the plurality of records including a unique combination of a primary key indicator range from a set of primary key indicator ranges and a time interval from a set of time intervals; and
      adding routing information for a distinct data store to each of the plurality of records;
   receiving a request pertaining to at least one data item;
   determining a primary key indicator and a time of the data item; and
   searching the plurality of records using the primary key indicator and the time of the data item to find at least one data store for the data item.

2. The method of claim 1 further comprising:
   accessing the found data store to perform the request pertaining to the data item.

3. The method of claim 1 wherein an existence of the plurality of data stores is invisible to an issuer of the request pertaining to the data item.

4. The method of claim 1 further comprising:
   dynamically adding a new record for a new data store to the plurality of records.

5. The method of claim 1 wherein the request pertaining to the data item is a request to store the data item, a request to delete the data item, or a request to retrieve the data item.

6. The method of claim 1 wherein the routing information includes database access credentials.

7. The method of claim 1 wherein the time is a timestamp of the data item and the time interval information includes a starting timestamp of a time interval and an ending timestamp of the time interval.

8. The method of claim 1 wherein the primary key indicator of the data item is any one of a numeric portion of a primary key of the data item, a substring of the primary key or a hash of the primary key.

9. A machine-readable storage medium including data that, when accessed by a machine, cause the machine to perform a method comprising:
- maintaining a plurality of records corresponding to a plurality of data stores, each of the plurality of records associating primary key indicators and time intervals pertaining to data items with distinct one or more of the plurality of data stores, wherein maintaining the plurality of records corresponding to the plurality data stores comprises:
  - creating the plurality of records, each of the plurality of records including a unique combination of a primary key indicator range from a set of primary key indicator ranges and a time interval from a set of time intervals; and
  - adding routing information for a distinct data store to each plurality of records;
- receiving a request pertaining to at least one data item;
- determining a primary key indicator and a time of the data item; and
- searching the plurality of records using the primary key indicator and the time of the data item to find at least one data store for the data item.

10. The machine-readable medium of claim 9 wherein an existence of the plurality of data stores is invisible to an issuer of the request pertaining to the data item.

11. The machine-readable medium of claim 9 wherein the method further comprises:
- dynamically adding a new record for a new data store to the plurality of records.

12. The machine-readable medium of claim 9 wherein each of the plurality of records includes routing information for a corresponding data store, the routing information including database access credentials.

13. An apparatus comprising:
- a database to store a plurality of records corresponding to a plurality of data stores, each of the plurality of records associating primary key indicators and time intervals pertaining to data items with distinct one or more of the plurality of data stores; and
- a data distribution manager, coupled to the database, to receive a request pertaining to at least one data item, to determine a primary key indicator and a time of the data item, and to search the plurality of records using the primary key indicator and the time of the data item to find at least one data store for the data item, wherein the data distribution manager is to maintain the plurality of records corresponding to the plurality of data stores by:
  - creating the plurality of records, each of the plurality of records including a unique combination of a primary key indicator range from a set of primary key indicator ranges and a time interval from a set of time intervals; and
  - adding routing information for a distinct data store to each of the plurality of records.

14. The apparatus of claim 13 further comprising:
- a data item router to access the found data store to perform the request pertaining to the data item.

15. The apparatus of claim 13 wherein an existence of the plurality of data stores is invisible to an issuer of the request pertaining to the data item.

16. The apparatus of claim 13 wherein the data distribution manager is further to dynamically add a new record for a new data store to the plurality of records.

17. The apparatus of claim 13 wherein each of the plurality of records includes routing information for a corresponding data store, the routing information comprising database access credentials.

18. The apparatus of claim 16 wherein the primary key indicator of the data item is any one of a numeric portion of a primary key of the data item, a substring of the primary key or a hash of the primary key.

* * * * *